US012567385B2

(12) United States Patent
Anand et al.

(10) Patent No.: US 12,567,385 B2
(45) Date of Patent: Mar. 3, 2026

(54) CIRCUIT DEVICE AND DISPLAY SYSTEM

(71) Applicant: SEIKO EPSON CORPORATION, Tokyo (JP)

(72) Inventors: Kumar Anandabairavasamy Anand, Richmond (CA); Sebdani Mahmood Mazrouei, Markham (CA); Stanislav Zaozerskii, Richmond (CA)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/961,782

(22) Filed: Nov. 27, 2024

(65) Prior Publication Data

US 2025/0174206 A1 May 29, 2025

(30) Foreign Application Priority Data

Nov. 29, 2023 (JP) ................................ 2023-201562

(51) Int. Cl.
*G09G 3/34* (2006.01)
*G09G 3/00* (2006.01)

(52) U.S. Cl.
CPC ........... *G09G 3/3426* (2013.01); *G09G 3/007* (2013.01); *G09G 2320/0233* (2013.01); *G09G 2320/0242* (2013.01); *G09G 2320/0686* (2013.01); *G09G 2340/0407* (2013.01)

(58) Field of Classification Search
None
See application file for complete search history.

(56) References Cited

U.S. PATENT DOCUMENTS

| | | | | |
|---|---|---|---|---|
| 12,400,610 | B2 * | 8/2025 | Mazrouei | G09G 3/006 |
| 2010/0052575 | A1 | 3/2010 | Feng et al. | |
| 2010/0110112 | A1 * | 5/2010 | Nakanishi | G09G 3/3426 345/690 |
| 2011/0169873 | A1 * | 7/2011 | Sano | G09G 3/3611 345/102 |
| 2011/0304657 | A1 * | 12/2011 | Yamamura | G09G 3/3426 345/690 |
| 2014/0043350 | A1 * | 2/2014 | Ikeda | G09G 5/10 356/213 |
| 2016/0180794 | A1 * | 6/2016 | Kurosawa | G09G 3/002 345/88 |
| 2021/0193066 | A1 * | 6/2021 | Anand | G09G 3/3648 |
| 2021/0311361 | A1 | 10/2021 | Okamoto et al. | |
| 2023/0245627 | A1 | 8/2023 | Akiba | |

FOREIGN PATENT DOCUMENTS

| | | | |
|---|---|---|---|
| JP | 2021-009170 | A | 1/2021 |

* cited by examiner

*Primary Examiner* — Matthew Yeung
(74) *Attorney, Agent, or Firm* — Harness, Dickey & Pierce, P.L.C.

(57) ABSTRACT

A circuit device includes a storage unit and a light source luminance determination circuit. The storage unit stores attenuation rate distribution information indicating an attenuation rate distribution of light with respect to a distance between a light source element and a pixel. The light source luminance determination circuit determines light source luminance information indicating luminance of light emitted by each of the plurality of light source elements, based on the attenuation rate distribution information. The circuit determines luminance based on a target pixel value when a selected pixel position is moved in opposite directions on a line. The selected pixel position is a pixel in first image data input to the circuit.

11 Claims, 9 Drawing Sheets

CIRCUIT DEVICE AND DISPLAY SYSTEM

The present application is based on, and claims priority from JP Application Serial Number 2023-201562, filed Nov. 29, 2023, the disclosure of which is hereby incorporated by reference herein in its entirety.

BACKGROUND

1. Technical Field

The present disclosure relates to a circuit device, a display system, and the like.

2. Related Art

JP-A-2021-9170 discloses a display device including a backlight divided into a plurality of control areas in which light-emission intensity can be changed independently of each other, and a backlight control unit that controls lighting of the backlight for each of the control areas. The backlight control unit determines the light-emission intensity of a light source for each of the control areas based on a gradation value of each pixel of input image data.

In local dimming, luminance of a light-emitting element corresponding to a bright portion of an image is increased. At this time, when the luminance of the light-emitting element is lost in balance between left and right sides of a display object, brightness of the display may be poor in balance between the left and right sides of the display object. For example, when the luminance of the light-emitting element is not bilaterally symmetrical with respect to a left-right symmetrical display object, the display object may not be displayed with symmetrical brightness on the left and right. When the luminance of the light-emitting element is lost in balance in up and down directions of the display object, the problem described above may also occur.

SUMMARY

An aspect of the present disclosure relates to a circuit device that controls a display device including light source elements and a display panel, the circuit device including: a storage unit that stores attenuation rate distribution information indicating an attenuation rate distribution of light with respect to a distance between a light source element among the light source elements and a pixel; and a light source luminance determination circuit that determines light source luminance information indicating luminance of light emitted by each of the plurality of light source elements, based on the attenuation rate distribution information, the light source luminance determination circuit being configured to determine, when a direction opposite to a first direction is defined as a second direction, the light source luminance information, based on a pixel value of a target pixel when a selected pixel position, which is a position of a pixel selected as the target pixel in first image data input to the light source luminance determination circuit, is moved in the first direction on a first line and a pixel value of the target pixel when the selected pixel position is moved in the second direction on the first line.

Another aspect of the present disclosure relates to a display system including the circuit device described above and the display device.

DESCRIPTION OF EMBODIMENTS

Hereinafter, a preferred embodiment of the present disclosure will be described in detail. It should be noted that the present embodiment described below is not intended to unduly limit the content described in the scope of claims, and all components described in the present embodiment are not necessarily essential requirements.

1. Electronic Apparatus, Display System, and Circuit Device

Figure 1:
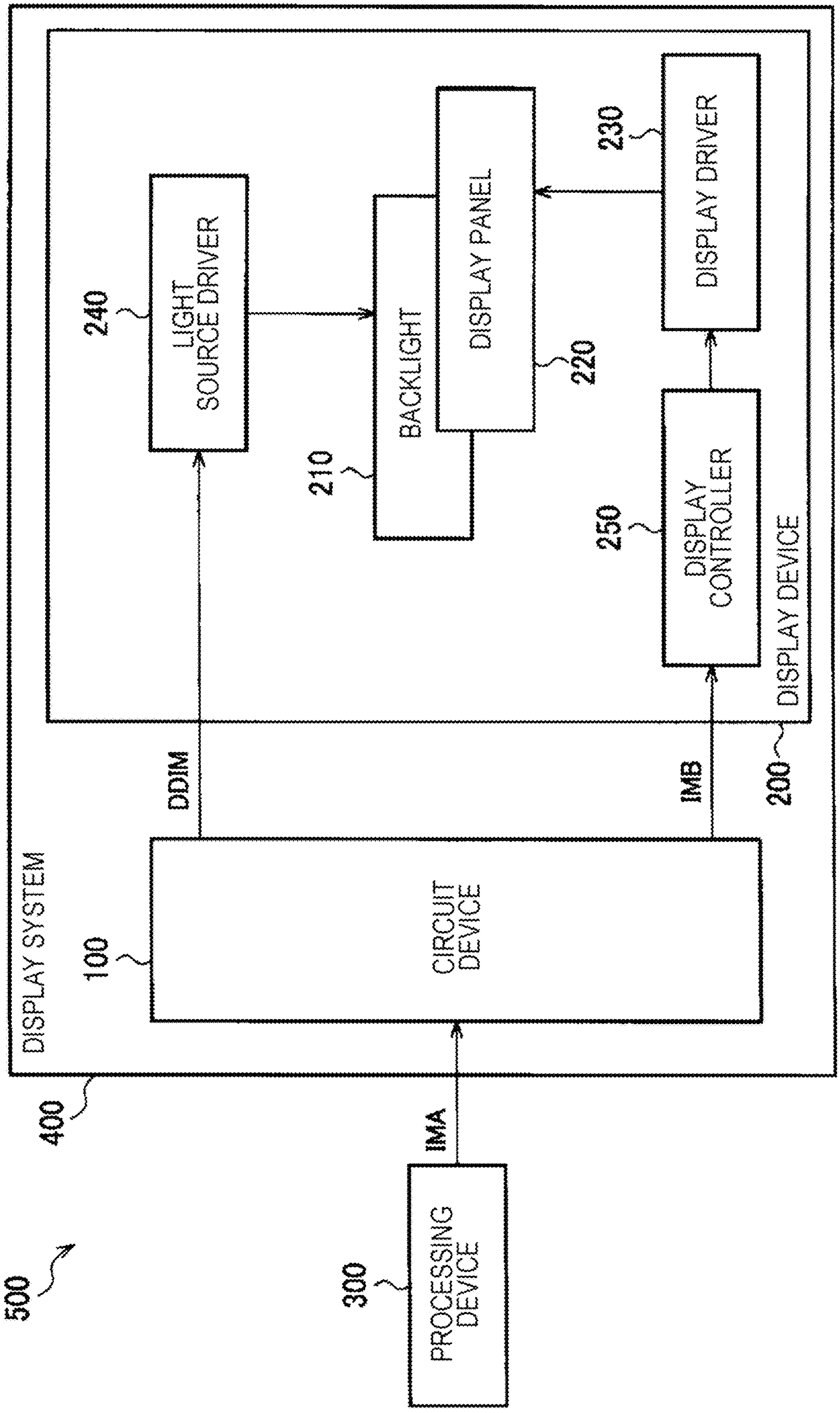
FIG. 1 is a diagram illustrating an example of a configuration of an electronic apparatus.

FIG. 1 illustrates an example of a configuration of an electronic apparatus including a display system of the present embodiment. An electronic apparatus 500 includes a processing device 300 and a display system 400. An example of the electronic apparatus 500 may be an in-vehicle display apparatus including an instrument panel, a center information display, a head-up display, or an electronic mirror, a television apparatus, or an information processing apparatus including a display.

The display system 400 includes a circuit device 100 and a display device 200. The circuit device 100 is, for example, an integrated circuit device in which circuit elements are integrated on a semiconductor substrate. Although the circuit device 100 and the display device 200 are illustrated as separate components in FIG. 1, the circuit device 100 may be provided in the display device 200.

The display device 200 includes a backlight 210, a display panel 220, a display driver 230, a light source driver 240, and a display controller 250. An example of the display device 200 is a display used for a television apparatus, an information processing apparatus, or the like. Alternatively, the display device 200 may be, for example, a head-mounted display including a projection device for eyes, or a head-up display including a projection device for a screen. When the display device 200 is a head-up display, the display device 200 further includes an optical system for projecting, onto a screen, light emitted from the backlight 210 and transmitted through the display panel 220.

In plan view of the backlight 210, light source elements are two-dimensionally arranged in the backlight 210. The light source elements are light-emitting elements that emit light by power supply, and are, for example, inorganic light-emitting diodes or organic light-emitting diodes. In local dimming control, the amounts of light of the two-dimensionally arranged light source elements are controlled independently of each other. Alternatively, the backlight 210 may be divided into areas. In plan view, light source elements are arranged in each of the areas. The light source elements arranged in an area are controlled to have the same amount of light, and the amounts of light of the respective areas are controlled independently of each other.

An example of the two-dimensional arrangement of the light source elements is a square arrangement in which the light source elements are arranged at all intersections of rows and columns. However, the two-dimensional arrangement is not limited to the square arrangement. For example, the two-dimensional arrangement may be an arrangement called, for example, a rhomboid arrangement or a zigzag arrangement. In this arrangement, the light source elements are arranged at the intersections of the odd-numbered columns and either of the odd-numbered rows or the even-numbered rows, and at the intersections of the even-numbered columns and the other of the odd-numbered rows and the even-numbered rows, and the light source elements are not arranged at the other intersections.

The light source driver 240 receives light source luminance data DDIM from the circuit device 100 and drives each of the light source elements of the backlight 210 based on the light source luminance data DDIM. The light source driver 240 is, for example, an integrated circuit device. Two or more light source drivers may be provided, and each of the light source drivers may be a separate integrated circuit device.

The display panel 220 is an electro-optical panel through which light from the backlight 210 is transmitted and which displays an image by controlling of a transmittance thereof. For example, the display panel 220 is a liquid crystal display panel.

The display controller 250 receives image data IMB from the circuit device 100 and transmits the image data IMB and a timing control signal for controlling a display timing to the display driver 230. The display controller 250 may perform image processing such as gradation correction, white balance correction, or scaling on the received image data IMB.

The display driver 230 drives the display panel based on the received image data IMB and timing control signal, thereby causing the display panel 220 to display an image. The display controller 250 and the display driver 230 may be configured by separate integrated circuit devices, or may be configured by a single integrated circuit device.

The processing device 300 transmits image data IMA to the circuit device 100. The processing device 300 is a processor such as a CPU, a GPU, a microcomputer, a DSP, an ASIC, or an FPGA. CPU is an abbreviation for Central Processing Unit. GPU is an abbreviation for Graphics Processing Unit. DSP is an abbreviation for Digital Signal Processor. ASIC is an abbreviation for Application Specific Integrated Circuit. FPGA is an abbreviation for Field Programmable Gate Array.

The circuit device 100 receives the image data IMA and performs local dimming control of the display device 200 based on the image data IMA. The circuit device 100 performs dimming on light-emission luminance of each light source element of the backlight 210 or each area of the backlight 210 according to luminance of the image data IMA and outputs light source luminance information, which is obtained by the dimming, to the light source driver 240 as light source luminance data DDIM. The circuit device 100 performs color correction on the image data IMA, based on the light source luminance information and outputs the image data IMB after the color correction to the display controller 250.

Figure 2:
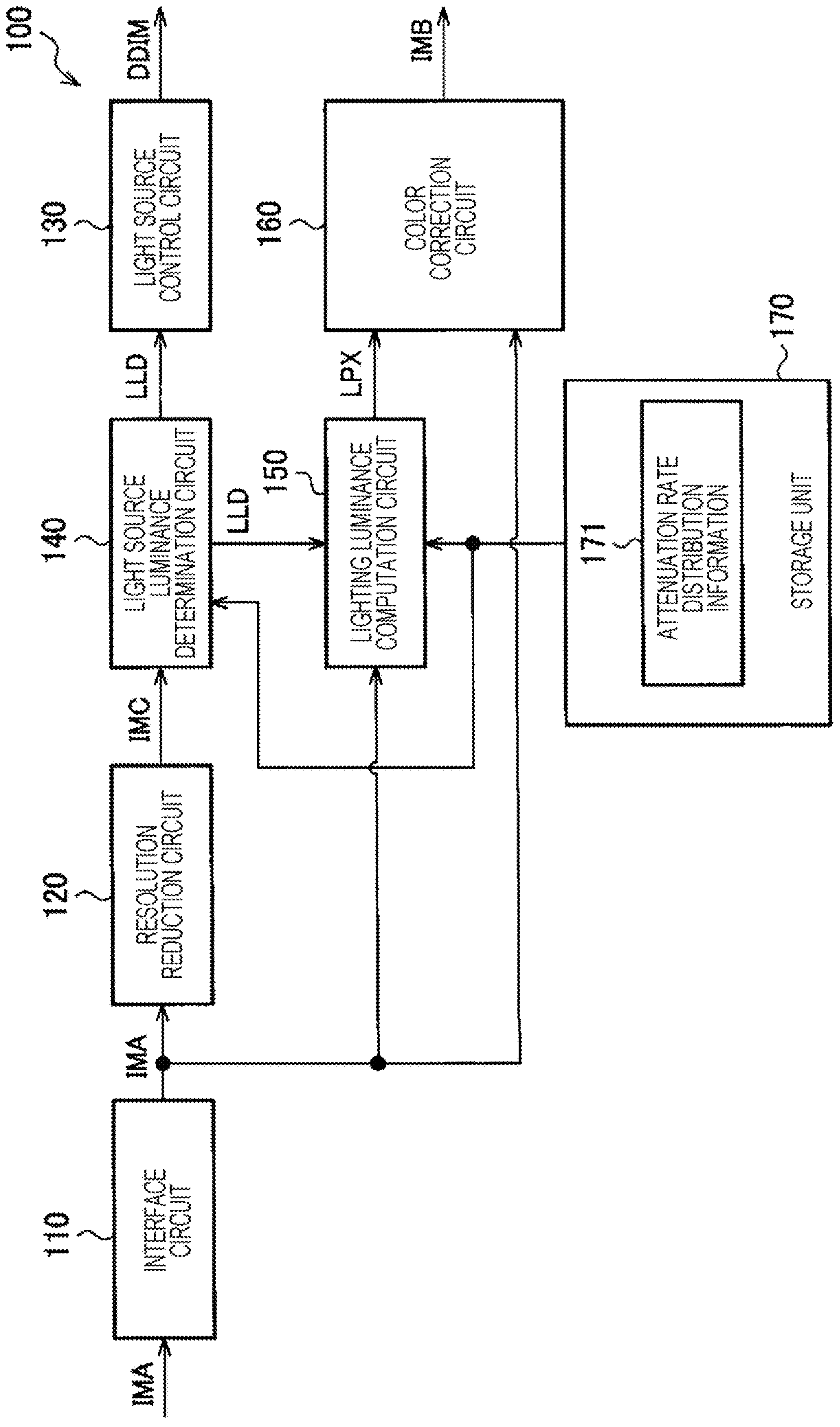
FIG. 2 is a detailed configuration example of a detailed configuration of a circuit device.

FIG. 2 illustrates a detailed configuration example of the circuit device. The circuit device 100 includes an interface circuit 110, a resolution reduction circuit 120, a light source control circuit 130, a light source luminance determination circuit 140, a lighting luminance computation circuit 150, a color correction circuit 160, and a storage unit 170. Hereinafter, a case will be described where dimming is independently performed for each light-emitting element of the backlight 210 in local dimming as an example, but dimming may be independently performed for each area including a plurality of light-emitting elements.

The interface circuit 110 receives the image data IMA from the processing device 300. The interface circuit 110 may be an interface circuit of various image interface systems such as LVDS, a parallel RGB system, and a display port. LVDS is an abbreviation for Low Voltage Differential Signaling.

The storage unit 170 stores attenuation rate distribution information 171. The storage unit 170 is a storage circuit such as a register or a memory. The memory is a volatile memory such as a RAM, or a non-volatile memory such as an OTP memory or an EEPROM. RAM is an abbreviation for Random Access Memory. OTP is an abbreviation for One Time Programmable. EEPROM is an abbreviation for Electrically Erasable Programmable Read Only Memory. The processing device 300 may write the attenuation rate distribution information 171 in the storage unit 170 via an interface circuit of an SPI system, an I2C system, or the like. Alternatively, when the storage unit 170 is a non-volatile memory, the attenuation rate distribution information 171 may be written in the storage unit 170 in advance.

The attenuation rate distribution information 171 indicates an attenuation rate distribution of light reaching the display panel from the light source element. The attenuation rate distribution indicates a relationship between a distance from the light source element to a pixel and an attenuation rate of light with which the light source element illuminates the pixel. The attenuation rate distribution is also referred to as an attenuation characteristic or a luminance distribution. The attenuation rate distribution information 171 is, for example, a lookup table in which the distance is input and from which the attenuation rate is output. Alternatively, the attenuation rate distribution information may be function information that defines a function of the attenuation rate distribution. An argument of the function is a distance, and a return value is an attenuation rate. The function information is, for example, a coefficient used for a function.

The image data IMA is input to the resolution reduction circuit 120 from the interface circuit 110. The image data IMA is also referred to as input image data. The resolution reduction circuit 120 performs processing to reduce the resolution of the image data IMA and generates low-resolution image data IMC having a lower resolution than the image data IMA. The "low resolution" means that the number of pixels of image data per frame is small.

The light source luminance determination circuit 140 performs dimming processing by using the low-resolution image data IMC and the attenuation rate distribution information 171 read from the storage unit 170, thereby determining light source luminance information indicating the light-emission luminance of each of the light source elements and outputting the light source luminance information as light source luminance data LLD. Details of the dimming processing will be described below with reference to FIG. 3 and subsequent drawings. Note that the resolution reduction circuit 120 may be omitted. In this case, the light source luminance determination circuit 140 determines the light source luminance information by performing the dimming processing by using the image data IMA and the attenuation rate distribution information 171.

The light source control circuit 130 controls the light source driver 240 based on the light source luminance data LLD. Specifically, the light source control circuit 130 outputs a timing control signal for controlling a light-emitting timing of the light-emitting element or an update timing of the light-emission luminance to the light source driver 240 and outputs the light source luminance data LLD as the light source luminance data DDIM to the light source driver 240. The light source driver 240 drives each of the light-emitting elements by a PWM signal having a pulse width corresponding to the light-emission luminance of each of the light source elements indicated by the light source luminance data DDIM, at a timing defined by the timing control signal. Thus, each of the light-emitting elements emits light with light-emission luminance controlled by the local dimming.

The lighting luminance computation circuit 150 computes lighting luminance information based on the light source luminance data LLD and the attenuation rate distribution information 171 stored in the storage unit 170 and outputs the lighting luminance information as lighting luminance data LPX. The lighting luminance information indicates lighting luminance at a position on the display panel 220 corresponding to each pixel of the image data IMA when the display panel 220 is illuminated by the backlight 210.

The color correction circuit 160 performs color correction on the image data IMA based on the lighting luminance data LPX and outputs the corrected image data IMB to the display driver 230. Specifically, the color correction circuit 160 multiplies pixel data of each pixel by a reciprocal number of luminance of light reaching the pixel and sets the obtained result as new pixel data.

The resolution reduction circuit 120, the light source control circuit 130, the light source luminance determination circuit 140, the lighting luminance computation circuit 150, and the color correction circuit 160 are logic circuits that process digital signals. Each of the resolution reduction circuit 120, the light source control circuit 130, the light source luminance determination circuit 140, the lighting luminance computation circuit 150, and the color correction circuit 160 may be configured by a separate logic circuit, or some or all of them may be configured by an integrated logic circuit. Alternatively, a processor such as a DSP may execute an instruction set or a program in which the functions of the resolution reduction circuit 120, the light source control circuit 130, the light source luminance determination circuit 140, the lighting luminance computation circuit 150, and the color correction circuit 160 are described, thereby implementing the functions of these circuits.

Alternatively, the circuit device 100 may be a processor such as a CPU, a GPU, a microcomputer, a DSP, an ASIC, or an FPGA. Then, the processor may execute an instruction set or a program in which a function of each unit of the circuit device 100 is described, thereby implementing the function of the circuit device 100.

The circuit device 100 may include a distortion correction circuit. The distortion correction circuit corrects image distortion caused by an optical system that projects, onto a screen or the like, an image displayed on the display panel 220, or image distortion caused by distortion of the screen. Specifically, the distortion correction circuit performs image correction for canceling or reducing the image distortion on the image data IMA received by the interface circuit 110 and outputs the corrected image data to the resolution reduction circuit 120, the lighting luminance computation circuit 150, and the color correction circuit 160. However, the distortion correction circuit may be provided in the processing device 300 instead of the circuit device 100.

2. Light Source Luminance Determination Circuit

Figure 3:
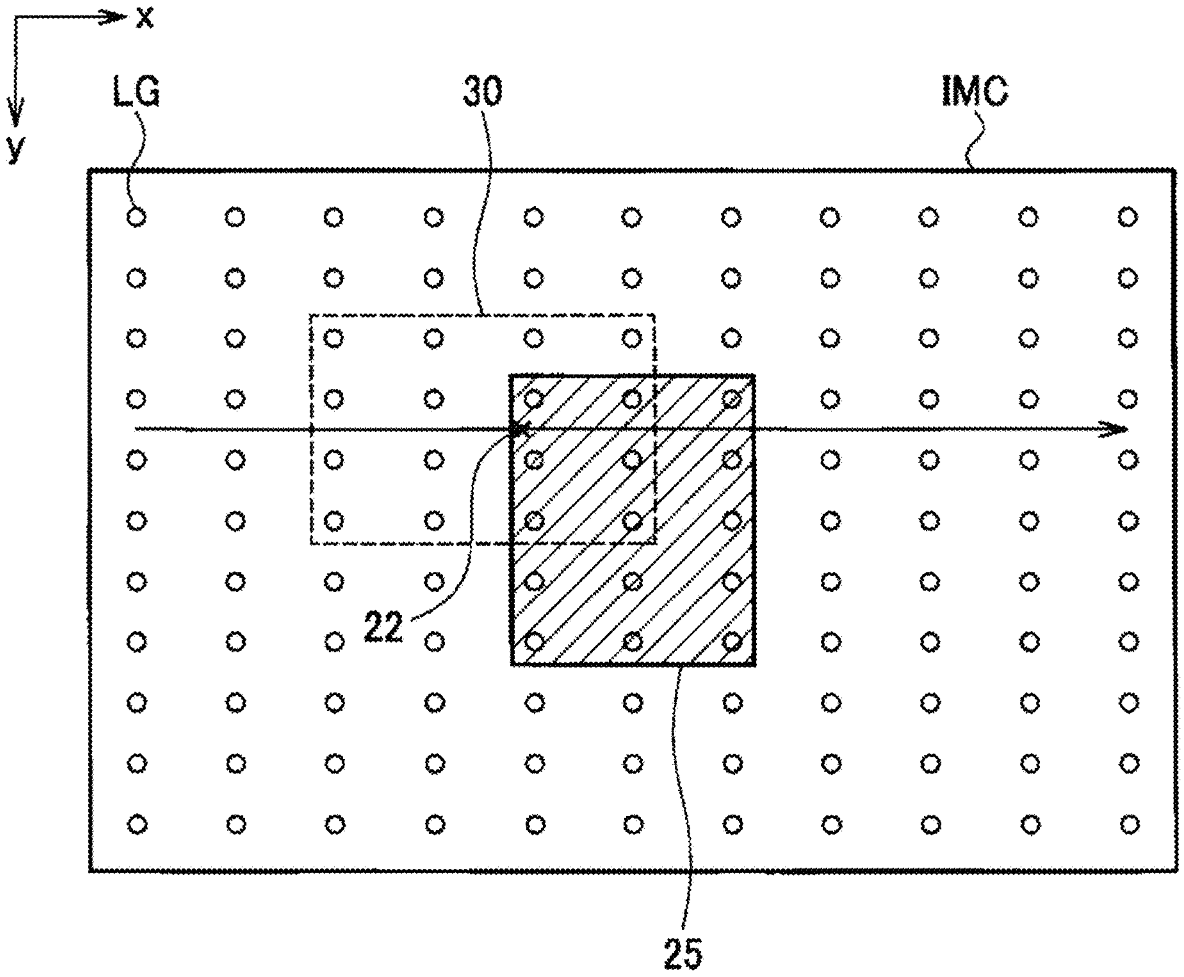
FIG. 3 is an explanatory diagram of processing to determine light source luminance.

FIG. 3 is an explanatory diagram of processing to determine the light source luminance. FIG. 3 illustrates a correspondence between an image displayed on the display panel 220 and light source elements LG of the backlight 210 when the display panel 220 and the backlight 210 are viewed in plan view. The low-resolution image data IMC is not displayed on the display panel 220, but a correspondence on the assumption that the low-resolution image data IMC is displayed is shown here. In FIG. 3, an x-direction indicates a horizontal scanning direction, and a y-direction indicates a vertical scanning direction. The horizontal scanning lines aligned in the +y-direction are referred to as a first horizontal scanning line, a second horizontal scanning line, and so on in order.

As will be described below with reference to FIG. 7 and the like, the light source luminance determination circuit 140 selects a target pixel 22 from the low-resolution image data IMC and selects 4×4 light source elements LG around the target pixel 22 as a light source element group 30. The light source luminance determination circuit 140 obtains luminance at which the light source element group 30 illuminates a position on the display panel 220 corresponding to the target pixel 22. When the luminance illuminated by the light source element group 30 is insufficient with respect to the luminance of the target pixel 22, the insufficient luminance is distributed to each of the light source elements of the light source element group 30 to update the light-emission luminance of each of the light source elements. The light source luminance determination circuit 140 determines the light-emission luminance of all the light source elements LG by repeatedly updating the light-emission luminance while shifting the target pixel 22 by one pixel at a time.

The light source luminance determination circuit 140 performs a process of repeating the above-described updating while selecting pixels of the first horizontal scanning line one by one in the x-direction as the target pixel 22, and then repeating the above-described updating while selecting pixels of the second horizontal scanning line one by one in the x-direction as the target pixel 22 and repeats such a process up to the last horizontal scanning line. FIG. 3 illustrates an example in which a high-luminance display object 25 is disposed on a black background as an image example. The display object 25 is assumed to be bilaterally symmetrical. At this time, since the target pixel 22 moves in the x-direction, the luminance is easily distributed to the light source element LG corresponding to a left side of the display object 25. That is, when the target pixel 22 is on a right side of the display object 25, the luminance is not distributed to the light source element LG corresponding to the right side of the display object 25 in a case where the target pixel 22 is illuminated with sufficient brightness by the light source element LG on the left side. For this reason, the luminance of the light source element LG tends to increase disproportionately to the left side of the display object 25.

As described above, in the method of determining the light-emission luminance by distributing the shortage of the luminance for illuminating the target pixel 22 to the luminance of the surrounding light source elements LG, when the target pixel 22 is moved in one direction, the luminance of the light source elements may be biased relative to the display object 25. Even when the display object 25 is not symmetrical, such a bias of the light-emission luminance may occur. Further, when the target pixel 22 is moved in the vertical scanning direction, the luminance of the light source element LG tends to increase disproportionately toward the upper side of the display object 25.

Figure 4:
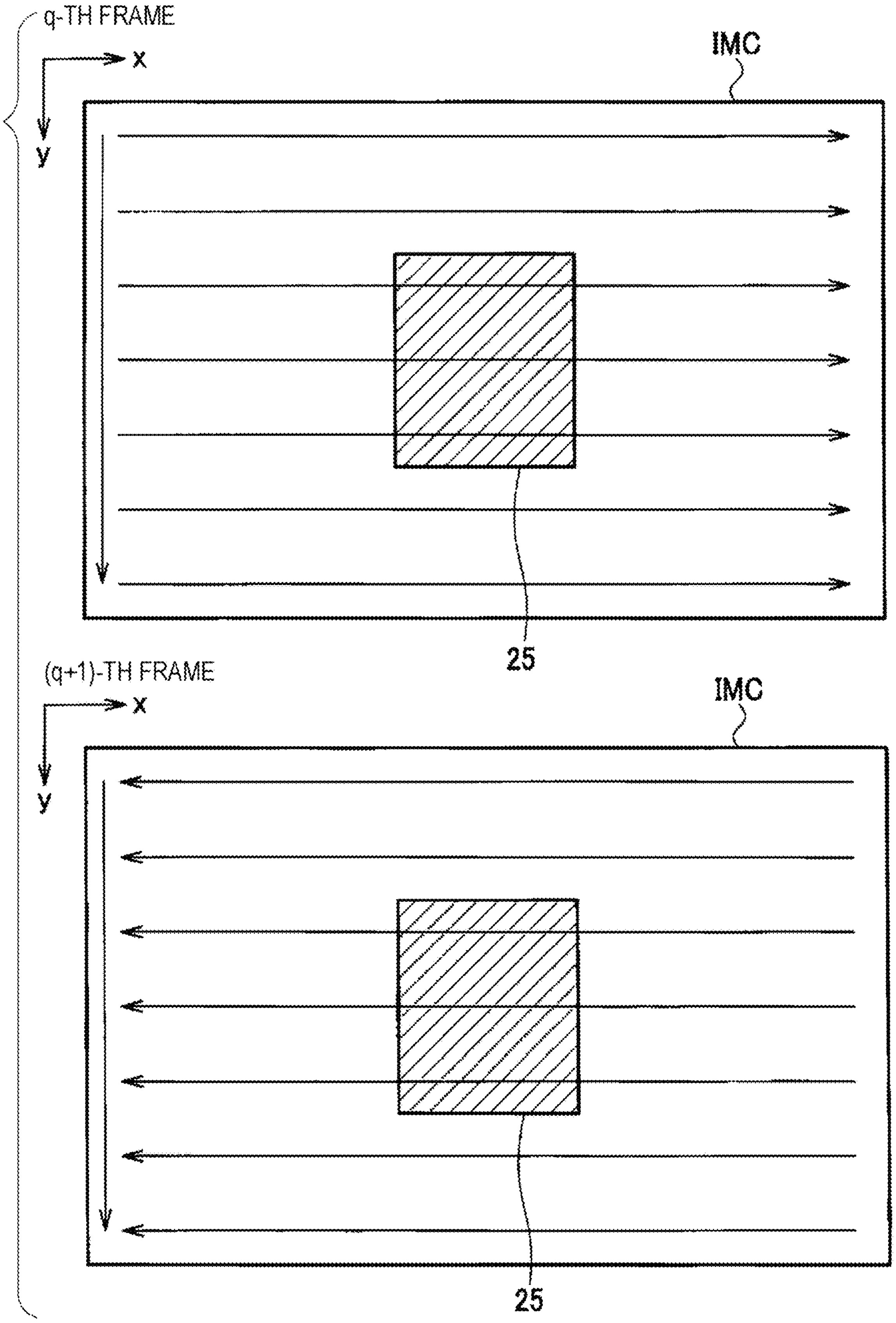
FIG. 4 is an explanatory diagram of processing performed by a light source luminance determination circuit of the present embodiment.

FIG. 4 is an explanatory diagram of processing performed by the light source luminance determination circuit of the present embodiment. Note that portions different from those in FIG. 3 will be mainly described, and description of portions similar to those in FIG. 3 is not given as appropriate.

The light source luminance determination circuit 140 repeats the updating of the light-emission luminance while selecting pixels of the horizontal scanning line one by one in the +x-direction as the target pixel 22 in a q-th frame and repeats the updating of the light-emission luminance while selecting pixels of the horizontal scanning line one by one in the −x-direction as the target pixel 22 in a (q+1)-th frame, q being either an odd number or an even number. The (q+1)-th frame is the next frame of the q-th frame. The light source luminance determination circuit 140 averages the light-emission luminance obtained in the q-th frame and the light-emission luminance obtained in the (q+1)-th frame for the same light-emitting element and sets an average value as final light-emission luminance. After determining light-emission luminance in a (q+2)-th frame, the light source luminance determination circuit 140 averages the light-emission luminance obtained in the (q+1)-th frame and the light-emission luminance obtained in the (q+2)-th frame for the same light-emitting element and sets an average value as final light-emission luminance.

The light-emitting elements with high luminance are biased to the left side of the display object 25 in the q-th frame, and the light-emitting elements with high luminance are biased to the right side of the display object 25 in the (q+1)-th frame, but the left-right bias of the backlight luminance is reduced by averaging them.

The light source luminance determination circuit 140 may perform both the process of updating the light-emission luminance while scanning in the +x-direction and the process of updating the light-emission luminance while scanning in the −x-direction for each frame and obtain the average value as the final light-emission luminance. At this time, when the resolution reduction circuit 120 is used, the number of pixels is reduced, and thus the processing load for determining the light source luminance is reduced. This makes it possible to suppress an increase in load even when both of the processes of obtaining the light-emission luminance are performed for each frame.

In the q-th frame, the light source luminance determination circuit 140 may perform a process of repeating the updating of the light-emission luminance while selecting pixels in a first column in the vertical scanning direction one by one in the +y-direction as the target pixel 22 and then repeating the updating of the light-emission luminance while selecting pixels in a second column in the vertical scanning direction one by one in the +y-direction as the target pixel 22, and repeat such a process up to the last column. In the (q+1)-th frame, the light source luminance determination circuit 140 may perform a process of repeating the updating of the light-emission luminance while selecting the pixels in the first column in the vertical scanning direction one by one in the −y-direction as the target pixel 22 and then repeating the updating of the light-emission luminance while selecting the pixels in the second column in the vertical scanning direction one by one in the −y-direction as the target pixel 22, and repeat such a process up to the last column. Then, the light source luminance determination circuit 140 may average the light-emission luminance obtained in the q-th frame and the light-emission luminance obtained in the (q+1)-th frame for the same light-emitting element and set the average value as final light-emission luminance.

In the q-th frame, the light source luminance determination circuit 140 may perform a process of repeating the updating of the light-emission luminance while selecting the pixels of the first horizontal scanning line one by one in the +x-direction as the target pixel 22 and then repeating the updating of the light-emission luminance while selecting the pixels of the second horizontal scanning line one by one in the +x-direction as the target pixel 22, and repeat such a process up to the last horizontal scanning line. In the (q+1)-th frame, the light source luminance determination circuit 140 may perform a process of repeating the updating of the light-emission luminance while selecting the pixels of the last horizontal scanning line one by one in the −x-direction as the target pixel 22 and then repeating the updating of the light-emission luminance while selecting the pixels of the horizontal scanning line immediately before the last horizontal scanning line one by one in the −x-direction as the target pixel 22, and repeat such a process up to the first horizontal scanning line. Then, the light source luminance determination circuit 140 may average the light-emission luminance obtained in the q-th frame and the light-emission luminance obtained in the (q+1)-th frame for the same light-emitting element and set the average value as final light-emission luminance.

Figure 5:
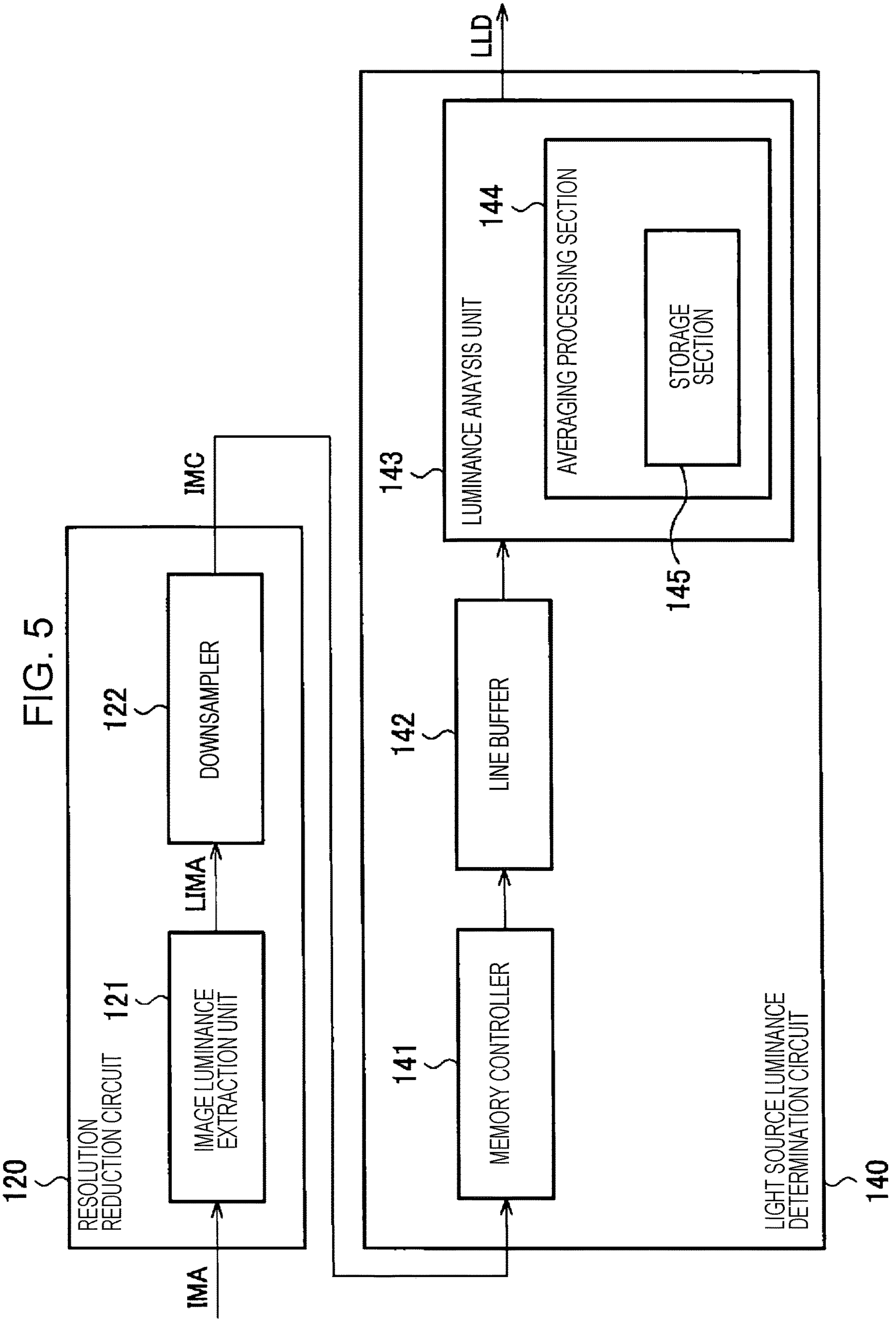
FIG. 5 is a detailed configuration example of a resolution reduction circuit and the light source luminance determination circuit.
Figure 6:
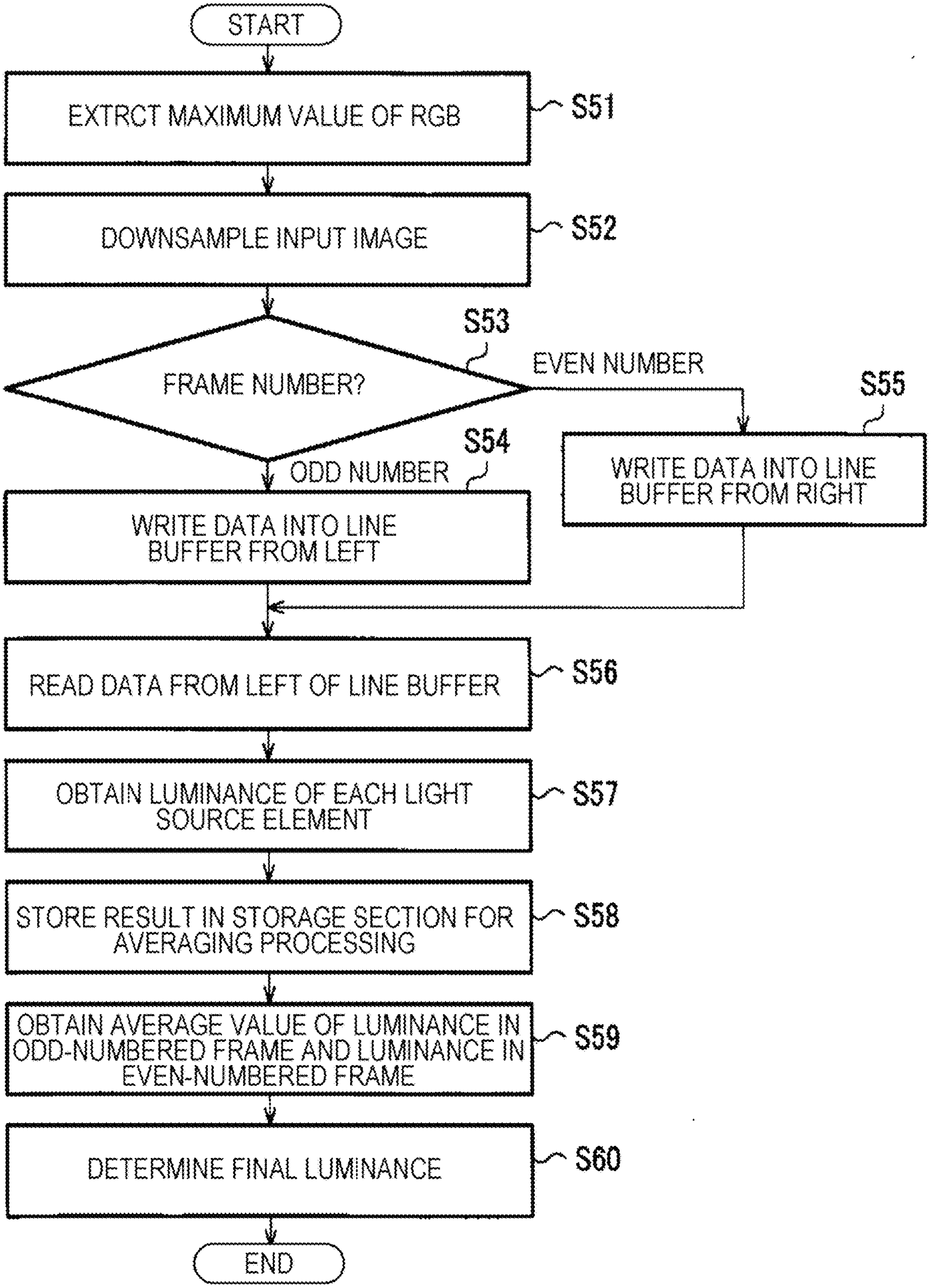
FIG. 6 is an example of a flow of processing performed by the resolution reduction circuit and the light source luminance determination circuit.

FIG. 5 illustrates a detailed configuration example of the resolution reduction circuit and the light source luminance determination circuit. The resolution reduction circuit 120 includes an image luminance extraction unit 121 and a downsampler 122. The light source luminance determination circuit 140 includes a memory controller 141, a line buffer 142, and a luminance analysis unit 143. FIG. 6 illustrates an example of a flow of processing performed by the resolution reduction circuit and the light source luminance determination circuit.

In step S51, the image luminance extraction unit 121 extracts the maximum value of RGB from each pixel data of the image data IMA and outputs the data after extraction as luminance image data LIMA. The image data IMA is an RGB color image and has RGB data for each pixel. The image luminance extraction unit 121 extracts the maximum value of R data, G data, and B data for each pixel. The image luminance extraction unit 121 may obtain a luminance value calculated from the R data, the G data, and the B data, for example, a luminance value Y in a YCrCb space.

In step S52, the downsampler 122 downsamples luminance image data LIMA having the same number of pixels as the image data IMA to generate low-resolution image data IMC having a smaller number of pixels than the image data IMA. The downsampling process is an interpolation process, a thinning process, a binning process, or the like.

In step S53, the memory controller 141 determines whether a frame number is an odd number or an even number, the process proceeds to step S54 when the frame number is an odd number, and the process proceeds to step S55 when the frame number is an even number.

In step S54, the memory controller 141 writes data of the horizontal scanning line of the low-resolution image data IMC into the line buffer 142 from the left. The left of the line buffer 142 corresponds to a left end of the horizontal scanning line and corresponds to a side on which scanning starts in horizontal scanning of normal raster scanning. For example, when an address of the line buffer 142 increases in the horizontal scanning direction, the memory controller 141 writes the data of the horizontal scanning line starting from the side with the smaller address.

In step S55, the memory controller 141 writes data of the horizontal scanning line of the low-resolution image data IMC into the line buffer 142 from the right. The right of the line buffer 142 corresponds to a right end of the horizontal scanning line and corresponds to a side on which scanning ends in horizontal scanning of normal raster scanning. For example, when the address of the line buffer 142 increases in the horizontal scanning direction, the memory controller 141 writes the data of the horizontal scanning line starting from the side with the larger address.

In step S56, the luminance analysis unit 143 reads the data of the horizontal scanning line from the left of the line buffer 142. For example, when the address of the line buffer 142 increases in the horizontal scanning direction, the luminance analysis unit 143 reads the data of the horizontal scanning line starting from the side with the smaller address.

In step S57, the luminance analysis unit 143 obtains the light-emission luminance of each of the light source elements, using the data read from the line buffer 142. The luminance analysis unit 143 performs a process of reading data for one pixel from the line buffer 142, updating the light-emission luminance using the data as a target pixel, reading data for the next one pixel from the line buffer 142, and updating the light-emission luminance using the data as a target pixel, and repeats such a process up to the last pixel of one frame to determine the light source luminance information for all the light source elements.

In the odd-numbered frame, since data is sequentially written in the line buffer 142 from the left and is sequentially read from the left, which is equivalent to the target pixel moving in the +x-direction. In the even-numbered frame, since data is sequentially written in the line buffer 142 from the right and is sequentially read from the left, which is equivalent to the target pixel moving in the −x-direction.

In step S58, the luminance analysis unit 143 stores the computation result in step S57 in a storage section 145 for averaging processing. The storage section 145 may be a memory such as an SRAM or a DRAM, or may be a register. The storage unit 170 may also serve as the storage section 145.

The luminance analysis unit 143 includes an averaging processing section 144. In step S59, the averaging processing section 144 obtains an average value of the light-emission luminance of each of the light source elements obtained in step S57 and the light-emission luminance of each of the light source elements in the previous frame stored in the storage section 145. It is assumed that the light-emission luminance of the q-th frame is stored in the storage section 145, and the light-emission luminance of the (q+1)-th frame is obtained in step S57. When the light source element at coordinates (x, y) in the q-th frame is represented by pow (x, y, q), the average value is {pow (x, y, q)+pow (x, y, q+1)}/2. The method of calculating the average value is not limited to simple arithmetic averaging, and may be weight arithmetic averaging, a smoothing filter in a time direction, or the like.

In step S60, the luminance analysis unit 143 determines the average value obtained by the averaging processing section 144 as final light source luminance information.

In step S53, when the frame number is an even number, the process may proceed to step S54, and when the frame number is an odd number, the process may proceed to step S55.

Alternatively, steps S54 and S55 may be executed for each frame. In this case, the light source luminance determination circuit 140 includes a frame memory. The memory controller 141 writes the low-resolution image data IMC of one frame in the frame memory. In the first half period of the next frame, the memory controller 141 writes the data of the horizontal scanning line of the low-resolution image data IMC read from the frame memory into the line buffer 142 from the left. Steps S56 to S58 are executed. In the second half period of the frame, the memory controller 141 writes the data of the horizontal scanning line of the low-resolution image data IMC read from the frame memory into the line buffer 142 from the right. Steps S56 and S57 are executed. In step S59, the averaging processing section 144 obtains an average value of the light-emission luminance of each of the light source elements obtained in the first half period of the frame and stored in the storage section 145 and the light-emission luminance of each of the light source elements obtained in the second half period of the frame.

Further, the light source luminance may be computed while scanning the low-resolution image data IMC in the vertical scanning direction. In this case, the light source luminance determination circuit 140 includes a frame memory. The memory controller 141 writes the low-resolution image data IMC of one frame in the frame memory. In the next frame, the memory controller 141 writes data of one column in the vertical scanning direction of the low-resolution image data IMC read from the frame memory into the line buffer 142 from the left. Steps S56 to S58 are executed. In the second half period of the frame, the memory controller 141 writes data of one column in the vertical scanning direction of the low-resolution image data IMC read from the frame memory into the line buffer 142 from the right. Steps S56 and S57 are executed. In step S59, the averaging processing section 144 obtains an average value of the light-emission luminance of each of the light source elements obtained in the first half period of the frame and stored in the storage section 145 and the light-emission luminance of each of the light source elements obtained in the second half period of the frame.

In the present embodiment, the circuit device 100 controls the display device 200 including the plurality of light source elements and the display panel 220. The circuit device 100 includes the storage unit 170 and the light source luminance determination circuit 140. The storage unit 170 stores attenuation rate distribution information 171 indicating an attenuation rate distribution of light with respect to a distance between the light source element and the pixel. The light source luminance determination circuit 140 determines light source luminance information indicating the luminance of light emitted by each of the plurality of light source elements, based on the attenuation rate distribution information 171. A direction opposite to a first direction is defined as a second direction. At this time, the light source luminance determination circuit 140 determines the light source luminance information, based on the pixel value of the target pixel when the selected pixel position is moved in the first direction on a first line and the pixel value of the target pixel when the selected pixel position is moved in the second direction on the first line. The selected pixel position is a position of a pixel selected as the target pixel in first image data input to the light source luminance determination circuit 140.

According to the present embodiment, the light source luminance information determined while the target pixel is moved in the first direction on the first line and the light source luminance information determined while the target pixel is moved in the second direction on the first line have opposite biases in the light-emission luminance with respect to the display object 25. The light source luminance information is determined based on these two pieces of light source luminance information, so that the bias in the light-emission luminance of the backlight 210 can be reduced.

In a case where the circuit device 100 includes the resolution reduction circuit 120, the first image data corresponds to the low-resolution image data IMC. In a case where the circuit device 100 does not include the resolution reduction circuit 120, the first image data corresponds to the image data IMA. The first direction may be either the x-direction or the y-direction. When the first direction is the x-direction, the first line corresponds to any horizontal scanning line. When the first direction is the y-direction, the first line corresponds to any pixel column in the vertical scanning direction.

In the present embodiment, the light source luminance determination circuit 140 may determine first light source luminance information, based on the pixel value of the target pixel when the selected pixel position is moved in the first direction on the first line in the first frame. The light source luminance determination circuit 140 may determine second light source luminance information, based on the pixel value of the target pixel when the selected pixel position is moved in the second direction on the first line in the second frame.

According to the present embodiment, final light source luminance information can be determined based on the first light source luminance information determined while the target pixel is moved in the first direction on the first line of the first frame and the second light source luminance information determined while the target pixel is moved in the second direction on the first line of the second frame.

In the example of FIG. 4, the first frame corresponds to the q-th frame, and the second frame corresponds to the (q+1)-th frame.

In the present embodiment, the light source luminance determination circuit 140 may perform averaging processing on the first light source luminance information and the second light source luminance information and output the light source luminance information after the averaging processing.

According to the present embodiment, by averaging of the first light source luminance information and the second light source luminance information in which the bias of the light-emission luminance with respect to the display object 25 is opposite from each other, the bias in the light-emission luminance of the backlight 210 can be reduced.

Without the averaging processing, the light-emitting element may be controlled by the first light source luminance information in the first frame, and the light-emitting element may be controlled by the second light source luminance information in the second frame. Since the light emission is alternately performed by the first light source luminance information and the second light source luminance information in which the bias of the light-emission luminance with respect to the display object 25 is opposite from each other, the bias in the light-emission luminance of the backlight 210 is reduced by temporal averaging in the sense of sight.

In the present embodiment, the light source luminance determination circuit 140 may determine first light source luminance information, based on the pixel value of the target pixel when the selected pixel position is moved in the first direction on the first line in the first frame. The light source luminance determination circuit 140 may determine the second light source luminance information, based on the pixel value of the target pixel when the selected pixel position is moved in the second direction on the first line in the first frame. Then, the light source luminance determination circuit 140 may perform averaging processing on the first light source luminance information and the second light source luminance information, and output the light source luminance information after the averaging processing.

According to the present embodiment, the first light source luminance information determined while the target pixel is moved in the first direction on the first line in one frame and the second light source luminance information determined while the target pixel is moved in the second direction on the first line in the second frame are determined and subjected to averaging processing. Thus, in each frame, the first light source luminance information and the second light source luminance information in which the bias in the light-emission luminance with respect to the display object 25 is opposite from each other are averaged. This makes it possible to improve responsiveness when an image changes between frames, compared with a method of making the direction opposite for each frame.

In the present embodiment, the light source luminance determination circuit 140 may include a line buffer 142 for buffering the first image data. When the selected pixel position is moved in the first direction, the line buffer 142 may output the first image data while scanning the first image data in the first direction. When the selected pixel position is moved in the second direction, the line buffer 142 may output the first image data while scanning the first image data in the second direction.

According to the embodiment, it is possible to control whether the target pixel is moved in the first direction or the target pixel is moved in the second direction according to the scanning direction when the line buffer 142 outputs the first image data.

In the present embodiment, the first direction may be the horizontal scanning direction. The second direction may be a direction opposite to the horizontal scanning direction.

According to the present embodiment, the light source luminance information is determined based on the light source luminance information determined while the target pixel is moved in the horizontal scanning direction on the first line and the light source luminance information determined while the target pixel is moved in the direction opposite to the horizontal scanning direction on the first line. Thus, it is possible to reduce the bias in the light-emission luminance in the left and right directions with respect to the display object 25.

In the present embodiment, the first direction may be the vertical scanning direction. The second direction may be a direction opposite to the vertical scanning direction.

According to the present embodiment, the light source luminance information is determined based on the light source luminance information determined while the target pixel is moved in the vertical scanning direction on the first line and the light source luminance information determined while the target pixel is moved in the direction opposite to the vertical scanning direction on the first line. Thus, it is possible to reduce the bias in the light-emission luminance in the up and down directions with respect to the display object 25.

In the present embodiment, the circuit device 100 may include the resolution reduction circuit 120 and the color correction circuit 160. The resolution reduction circuit 120 may generate, from the input image data IMA, first image data having a resolution lower than that of the input image data IMA. The color correction circuit 160 may perform color correction on the input image data IMA based on the light source luminance information after the averaging processing.

According to the present embodiment, since the number of pixels to be computed is reduced by using the first image data having a lower resolution than the input image data IMA in the determination of the light source luminance, the processing load is reduced.

3. Light Source Luminance Determination Circuit and Lighting Luminance Computation Circuit FIG. 7 illustrates an example of a flow of processing performed by the light source luminance determination circuit. This flow corresponds to S54, S56, and S57 in FIG. 6 in the odd-numbered frame, and corresponds to S55, S56, and S57 in FIG. 6 in the even-numbered frame.

In step S2, the light source luminance determination circuit 140 initializes light source luminance information. For example, the luminance values of all the light source elements are initialized to zero.

In step S3, the light source luminance determination circuit 140 selects one pixel from the pixels included in the low-resolution image data IMC. The selected pixel is referred to as a target pixel. Specifically, the light source luminance determination circuit 140 reads data corresponding to one pixel from the line buffer 142 and sets the data as data of the target pixel. Through a loop from step S3 to step S6, target pixels are sequentially selected, and this selection order is as described in the flow of FIG. 6 and the like.

Figure 8:
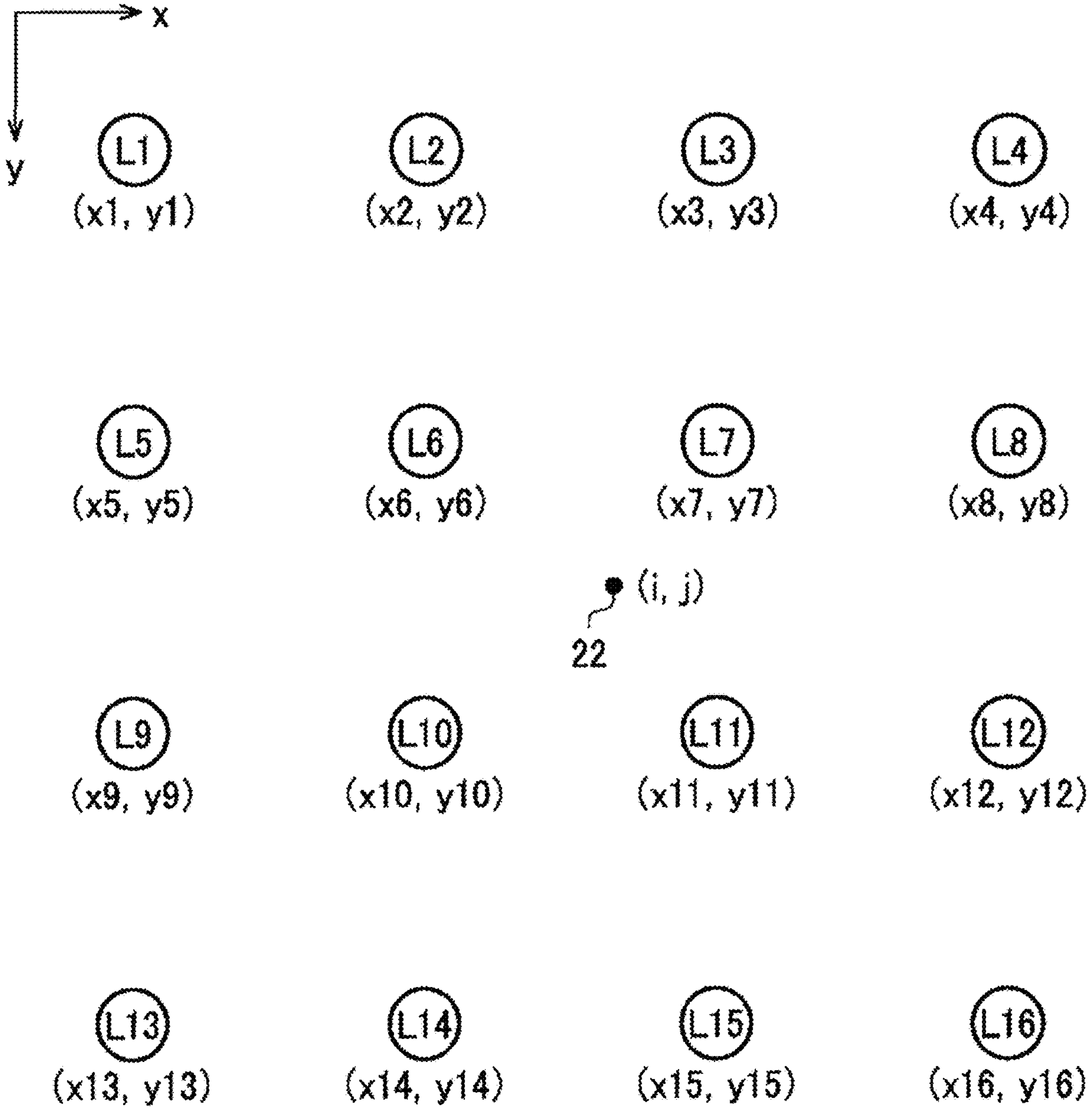
FIG. 8 is a diagram illustrating an example of surrounding light source elements.

In step S4, the light source luminance determination circuit 140 selects n×m light source elements around the target pixel from the light source elements of the backlight 210. The n×m light source elements are also referred to as surrounding light source elements, where each of n and m may be an integer of 2 or more. FIG. 8 illustrates an example of surrounding light source elements. Here, an example of n=m=4 is shown.

As illustrated in FIG. 8, a position of the target pixel 22 is set to (i, j), where i indicates an x coordinate in the image data IMA, and j indicates a y coordinate in the image data IMA. In the flow of FIG. 7, the target pixel 22 is a pixel of the low-resolution image data IMC, but xy coordinates in the image data IMA corresponding to xy coordinates in the low-resolution image data IMC are used. The light source luminance determination circuit 140 selects light source elements L1 to L16 in the nearest two columns in each of a +x-direction and a −x-direction and in the nearest two rows in each of the +y-direction and the −y-direction based on the position (i, j). When k is an integer of 1 or more and 16 or less, a position of a light source element Lk is represented by (xk, yk). Here, (xk, yk) is an xy coordinate on the image data IMA corresponding to the light source element Lk. Note that (i, j) and (xk, yk) may be xy coordinates on the low-resolution image data IMC.

Figure 7:
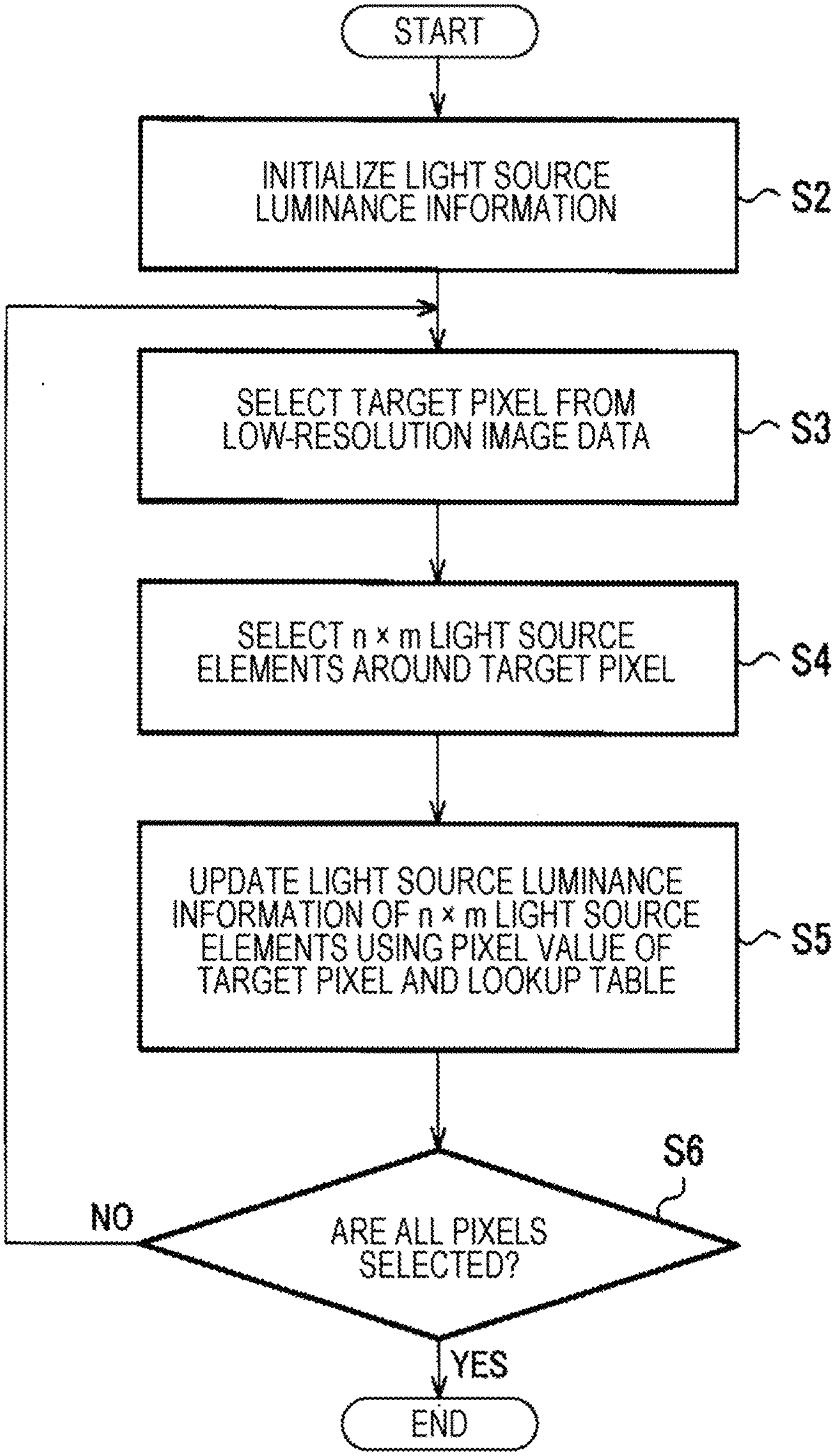
FIG. 7 is an example of a flow of processing performed by the light source luminance determination circuit.

In step S5 of FIG. 7, the light source luminance determination circuit 140 updates the light source luminance information of the n×m light source elements selected in step S4, using the pixel value of the target pixel 22 in the low-resolution image data IMC and the attenuation rate distribution information 171 stored in the storage unit 170.

In step S6, the light source luminance determination circuit 140 determines whether all of the pixels have been selected as the target pixels, the process ends when all of the pixels have been selected, and the process returns to step S3 when there is any pixel that has not been selected.

A description will be made with respect to update processing of the light source luminance information in step S5. The light source luminance determination circuit 140 determines, from Formula (1) below, a required variation amount $\Delta_{ij}$ indicating a variation amount required for the amount of light received by the target pixel 22 from the light source elements L1 to L16.

$$\Delta_{ij} = INT_{ij} - \sum_{k=1}^{16} lsf(k) \times powc(k) \tag{1}$$

In Formula (1) above, $INT_{ij}$ indicates the luminance value of the target pixel 22 in the low-resolution image data IMC, and lsf (k) indicates an attenuation rate of the light with which the light source element Lk illuminates the target pixel 22. The light source luminance determination circuit 140 determines the distance between the target pixel 22 and the light source element Lk, and determines an attenuation rate lsf (k) corresponding to the determined distance from the attenuation rate distribution information 171. Where, powc (k) indicates previous light source luminance information of the light source element Lk. The previous light source luminance information is light source luminance information calculated using a previous target pixel selected immediately before the current target pixel 22. The previous target pixel is a pixel at a position (i−1, j) immediately before the position (i, j) in the +x-direction in the odd-numbered frame, and is a pixel at a position (i+1, j) immediately before the position (i, j) in the −x-direction in the even-numbered frame.

The light source luminance determination circuit 140 updates the light source luminance information by distributing the required variation amount $\Delta_{ij}$ to the light source luminance information of the light source element Lk using Formula (2) below.

$$powu(k) = \begin{cases} powc(k) + \Delta_{ij}\dfrac{lsf(k)}{\sum_{\alpha=1}^{16} lsf(\alpha)}, & \text{if } \Delta_{ij} > 0 \\ powc(k), & \text{if } \Delta_{ij} \le 0 \end{cases} \tag{2}$$

The loop of steps S3 to S6 is executed up to the last pixel of the low-resolution image data IMC, whereby the light-emission luminance of all the light source elements of the backlight 210 are determined using one frame of low-resolution image data IMC. The final light-emission luminance is the average value of the light-emission luminance determined in the odd-numbered frame and the light-emission luminance determined in the even-numbered frame.

Figure 9:
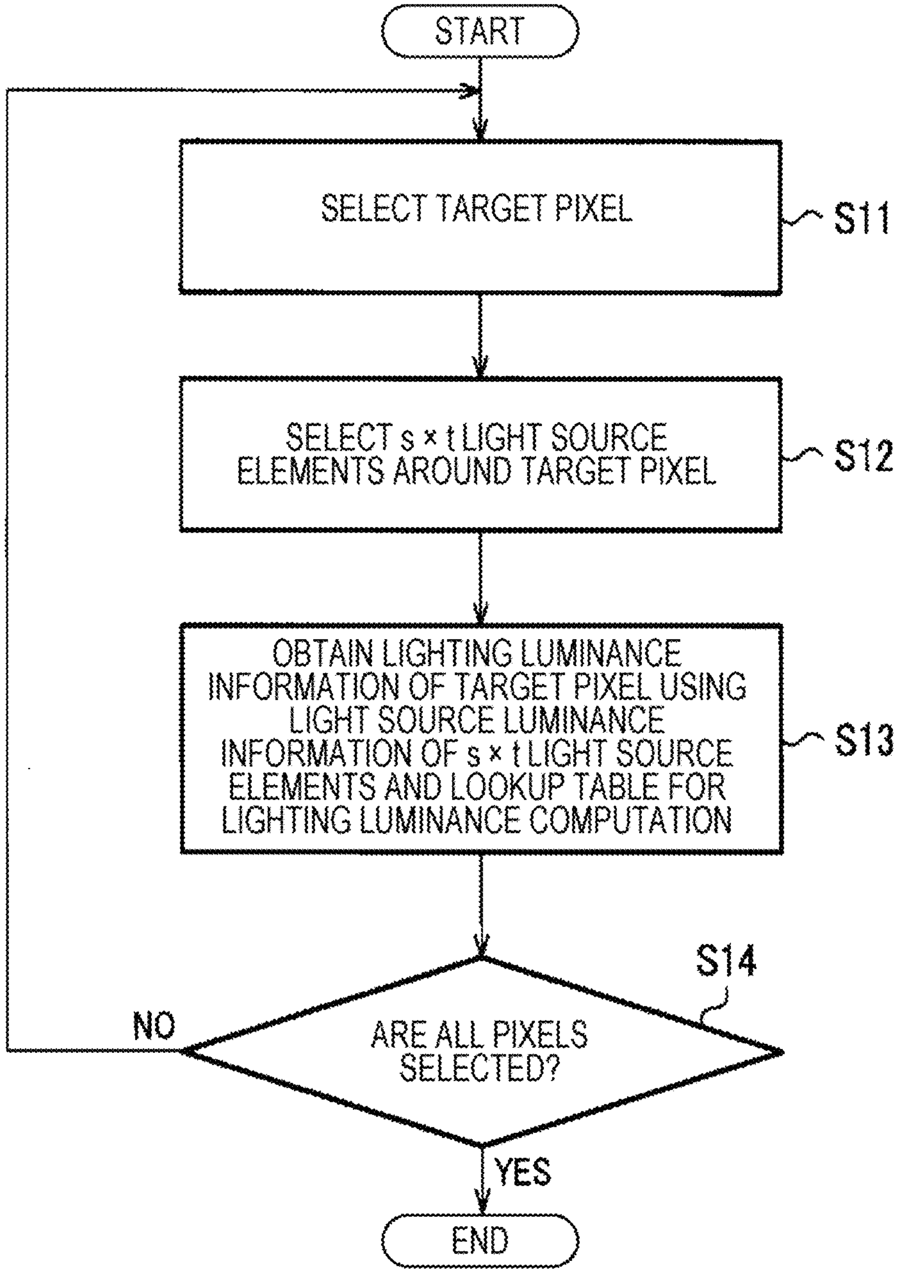
FIG. 9 is an example of a flow of processing performed by a lighting luminance computation circuit.

FIG. 9 is an example of a flow of processing performed by the lighting luminance computation circuit. Although the example of the surrounding light source elements in FIG. 8 is also used here, the processing performed by the lighting luminance computation circuit 150 is is separated from the processing performed by the light source luminance determination circuit 140.

In step S11, the lighting luminance computation circuit 150 selects one pixel from the pixels in the image data IMA. The selected pixel is referred to as a target pixel. Through a loop from step S11 to step S14, target pixels are sequentially selected. For example, a process is performed in which a first pixel of a first scanning line of the image data IMA is selected in the first round of step S11, a second pixel, a third pixel, and the like are sequentially selected in the next and following rounds of step S11, and pixels of a second scanning line are sequentially selected when all the pixels of the first scanning line are selected, and such a process is repeated up to a final scanning line.

In step S12, the lighting luminance computation circuit 150 selects s×t light source elements around the target pixel from the light source elements of the backlight 210. The s×t light source elements are also referred to as surrounding light source elements, where each of s and t may be an integer of 2 or more, and FIG. 8 illustrates an example of s=t=4. However, the s×t and the n×m may be different.

The lighting luminance computation circuit 150 selects light source elements L1 to L16 in the two nearest columns in each of the +x-direction and the −x-direction and in the two nearest rows in each of the +y-direction and the −y-direction based on the position (i, j). When β is an integer of 1 or more and 16 or less, a position of the light source element Lβ is represented by (xβ, yβ).

In step S13, the lighting luminance computation circuit 150 obtains the lighting luminance information of the target pixel, using the light source luminance information of the selected s×t light source elements and the attenuation rate distribution information 171.

In step S14, the lighting luminance computation circuit 150 determines whether all of the pixels have been selected as the target pixels, the process ends when all of the pixels have been selected, and the process returns to step S11 when there is any pixel that has not been selected.

A description will be made with respect to computation processing of the lighting luminance information in step S13. The lighting luminance computation circuit 150 obtains the lighting luminance information of the target pixel 22 using Formulas (3) and (4) below.

$$PL(i,j)=\sum_{\beta=1}^{s\times t} pow(\beta)\times lsf(\beta) \tag{3}$$

$$lsf(\beta)=lsf\left((i-x\beta)^2+(j-y\beta)^2\right) \tag{4}$$

In Formula (3) above, PL (i, j) indicates the lighting luminance information for the pixel at the position (i, j), pow (β) indicates the light source luminance information determined by the light source luminance determination circuit 140, and lsf (β) indicates an attenuation rate of light with which a light source element Lβ illuminates the target pixel 22. The lighting luminance computation circuit 150 obtains a distance between the target pixel 22 and the light source element Lβ, and obtains an attenuation rate lsf (β) corresponding to the distance from the attenuation rate distribution information 171. In Formula (4) above, a square of a distance is used as an input to the lookup table, but the distance may be used as an input to the lookup table.

After the loop of steps S3 to S6 in the flow of FIG. 7 is executed up to the last pixel of the low-resolution image data IMC, the powu in Formula (2) above is the light source luminance information of one frame. The average value of the powu in the odd-numbered frame and the powu in the even-numbered frame is used as pow in Formula (3) above.

The lighting luminance computation circuit 150 may obtain the lighting luminance information of the target pixel not only from the light source luminance information of the s×t light source elements around the target pixel but also from the light source luminance information of all the light source elements of the backlight 210.

In the present embodiment, the light source luminance determination circuit 140 selects a p-th pixel in the first image data as the target pixel 22, where p is an integer of 2 or more. The light source luminance determination circuit 140 updates, based on (p−1)-th light source luminance information obtained based on a pixel value of a (p−1)-th pixel, a pixel value of the p-th pixel, and the attenuation rate distribution information 171, the (p−1)-th light source luminance information, whereby performing update processing to obtain p-th light source luminance information. When the selected pixel position (i, j) is moved in the first direction, the p-th pixel is a pixel in the first direction of the (p−1)-th pixel. When the selected pixel position (i, j) is moved in the second direction, the p-th pixel is a pixel in the second direction of the (p−1)-th pixel.

In the present embodiment, in the update processing, the light source luminance determination circuit 140 determines the required variation amount $\Delta_{ij}$ of the luminance for illuminating the p-th pixel in the display panel 220, based on the pixel value of the p-th pixel and the (p−1)-th light source luminance information, and updates the (p−1)-th light source luminance information, based on the required variation amount $\Delta_{ij}$ and the attenuation rate distribution information 171, thereby determining the p-th light source luminance information.

According to the present embodiment, the biases in the light-emission luminance with respect to the display object 25 are opposite between a case of performing the update processing while moving the selected pixel position (i, j) in the first direction and a case of performing the update processing while moving the selected pixel position (i, j) in the second direction. Since the light source luminance information is determined based on the light source luminance information obtained in the two directions, the bias in the light-emission luminance of the backlight 210 can be reduced.

In the examples of FIGS. 7 and 8, the first image data is the low-resolution image data IMC, but the first image data may be the image data IMA when the resolution reduction circuit 120 is not provided. In the examples of FIGS. 7 and 8, the first direction is the horizontal scanning direction, but the first direction may be the vertical scanning direction. In the examples of FIGS. 7 and 8, when the selected pixel position (i, j) is moved in the first direction, the coordinates of the p-th pixel are (i, j), and the coordinates of the (p−1)-th pixel are (i−1, j). When the selected pixel position (i, j) is moved in the second direction, the coordinates of the p-th pixel are (i, j) and the coordinates of the (p−1)-th pixel are (i+1, j). As described above, the first direction may be the vertical scanning direction. In this case, when the selected pixel position (i, j) is moved in the first direction, the coordinates of the p-th pixel may be (i, j) and the coordinates of the (p−1)-th pixel may be (i, j−1). When the selected pixel position (i, j) is moved in the second direction, the coordinates of the p-th pixel may be (i, j) and the coordinates of the (p−1)-th pixel may be (i, j+1).

Although the present embodiment has been described in detail above, it will be easily understood by those skilled in the art that various modifications can be made without substantially departing from the novel matters and effects of the present disclosure. Therefore, all such modifications are included in the scope of the present disclosure. For example, the terms described together with different terms having a broader meaning or the same meaning at least once in the specification or the drawings can be replaced with the different terms in any part in the specification or the drawings. Further, all combinations of the present embodiment and the modifications may be within the scope of the present disclosure. In addition, the configurations, operations, and the like of the interface circuit, the resolution reduction circuit, the light source luminance determination circuit, the lighting luminance computation circuit, the light source control circuit, the color correction circuit, the storage unit, the circuit device, the backlight, the display panel, the display device, the processing device, and the electronic apparatus are not limited to those described in the embodiments, and various modifications can be made.

What is claimed is:

1. A circuit device that controls a display device including a plurality of light source elements and a display panel, the circuit device comprising:

a storage unit that stores attenuation rate distribution information indicating an attenuation rate distribution of light with respect to a distance between a light source element among the light source elements and a pixel; and a light source luminance determination circuit that determines light source luminance information indicating luminance of light emitted by each of the plurality of light source elements, based on the attenuation rate distribution information, wherein the light source luminance determination circuit determines, when a direction opposite to a first direction is defined as a second direction, the light source luminance information, based on a pixel value of a target pixel when a selected pixel position, which is a position of a pixel selected as the target pixel in first image data input to the light source luminance determination circuit, is moved in the first direction on a first line and a pixel value of the target pixel when the selected pixel position is moved in the second direction on the first line.

2. The circuit device according to claim 1, wherein the light source luminance determination circuit determines first light source luminance information, based on a pixel value of the target pixel when the selected pixel position is moved in the first direction on the first line in a first frame, and determines second light source luminance information, based on a pixel value of the target pixel when the selected pixel position is moved in the second direction on the first line in a second frame.

3. The circuit device according to claim 2, wherein the light source luminance determination circuit performs averaging processing on the first light source luminance information and the second light source luminance information and outputs the light source luminance information after the averaging processing.

4. The circuit device according to claim 1, wherein the light source luminance determination circuit determines first light source luminance information, based on a pixel value of the target pixel when the selected pixel position is moved in the first direction on the first line in a first frame, determines second light source luminance information, based on a pixel value of the target pixel when the selected pixel position is moved in the second direction on the first line in the first frame, and performs averaging processing on the first light source luminance information and the second light source luminance information and outputs the light source luminance information after the averaging processing.

5. The circuit device according to claim 1, wherein the light source luminance determination circuit performs update processing to determine p-th light source luminance information by selecting a p-th pixel as the target pixel in the first image data and updating, based on (p−1)-th light source luminance information obtained based on a pixel value of a (p−1)-th pixel, a pixel value of the p-th pixel, and the attenuation rate distribution information, the (p−1)-th light source luminance information, p being an integer of 2 or more, when the selected pixel position is moved in the first direction, the p-th pixel is a pixel in the first direction of the (p−1)-th pixel, and when the selected pixel position is moved in the second direction, the p-th pixel is a pixel in the second direction of the (p−1)-th pixel.

6. The circuit device according to claim 5, wherein the light source luminance determination circuit in the update processing, determines a required variation amount of luminance for illuminating the p-th pixel in the display panel, based on the pixel value of the p-th pixel and the (p−1)-th light source luminance information and updates the (p−1)-th light source luminance information, based on the required variation amount and the attenuation rate distribution information, thereby determining the p-th light source luminance information.

7. The circuit device according to claim 1, wherein the light source luminance determination circuit includes a line buffer that buffers the first image data, and the line buffer outputs the first image data while scanning the first image data in the first direction when the selected pixel position is moved in the first direction, and outputs the first image data while scanning the first image data in the second direction when the selected pixel position is moved in the second direction.

8. The circuit device according to claim 1, wherein the first direction is a horizontal scanning direction, and the second direction is a direction opposite to the horizontal scanning direction.

9. The circuit device according to claim 1, wherein the first direction is a vertical scanning direction, and the second direction is a direction opposite to the vertical scanning direction.

10. The circuit device according to claim 1, further comprising a resolution reduction circuit that generates, from input image data, the first image data having a lower resolution than the input image data; and a color correction circuit that performs color correction on the input image data, based on the light source luminance information after the averaging processing.

11. A display system comprising:

the circuit device according to claim 1; and the display device.

* * * * *